Dec. 21, 1926.                                                          1,611,701
                              E. J. WILSON
            STEERING MECHANISM FOR ENDLESS TRACK PROPELLED VEHICLES
                           Filed Dec. 17, 1924                  2 Sheets-Sheet 1
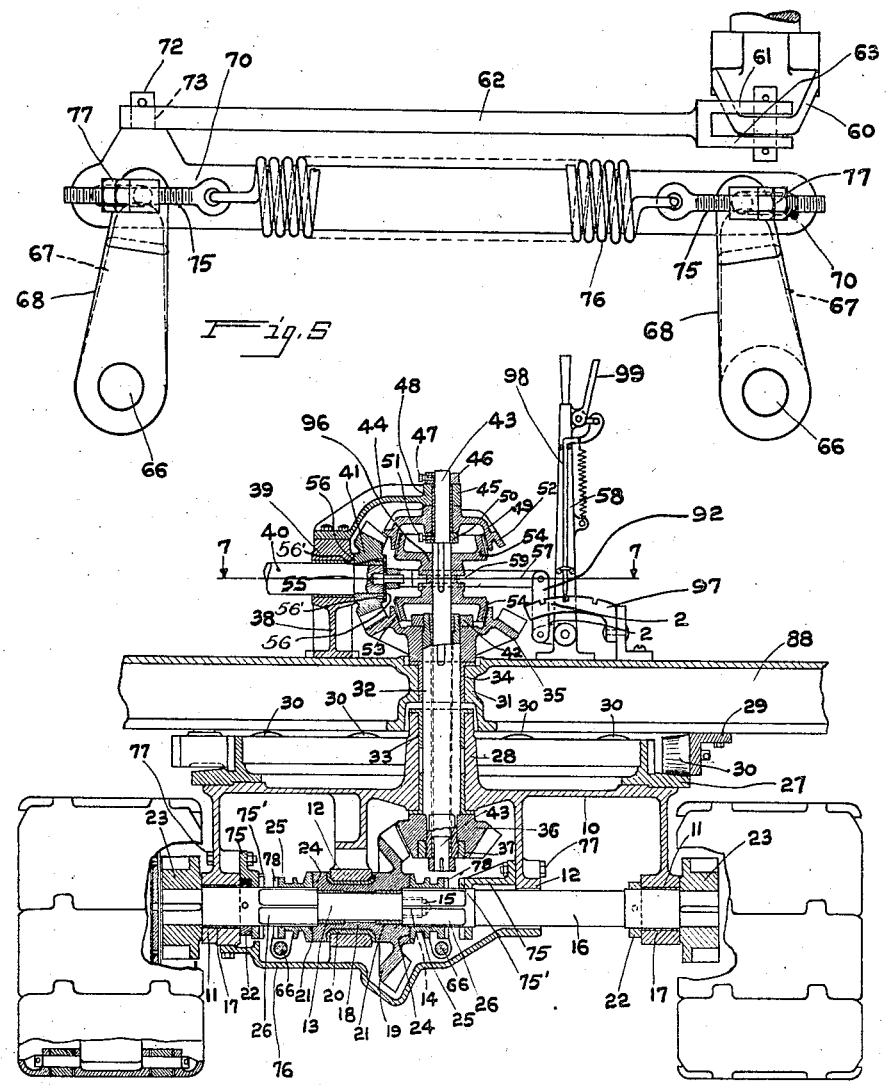
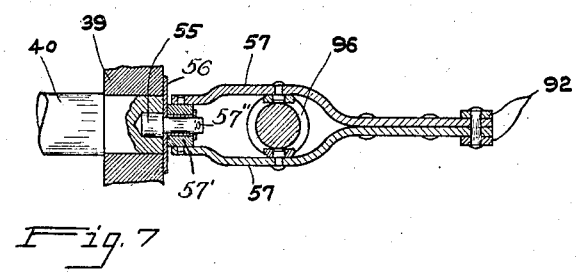
INVENTOR
Emery J. Wilson
BY
Richey Slough + Watts
ATTORNEYS.

Dec. 21, 1926.
E. J. WILSON
1,611,701
STEERING MECHANISM FOR ENDLESS TRACK PROPELLED VEHICLES
Filed Dec. 17, 1924
2 Sheets-Sheet 2
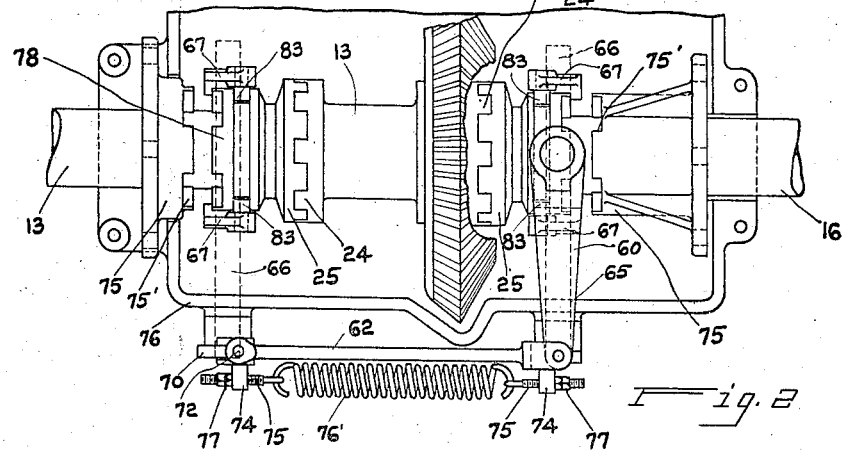
Fig. 2
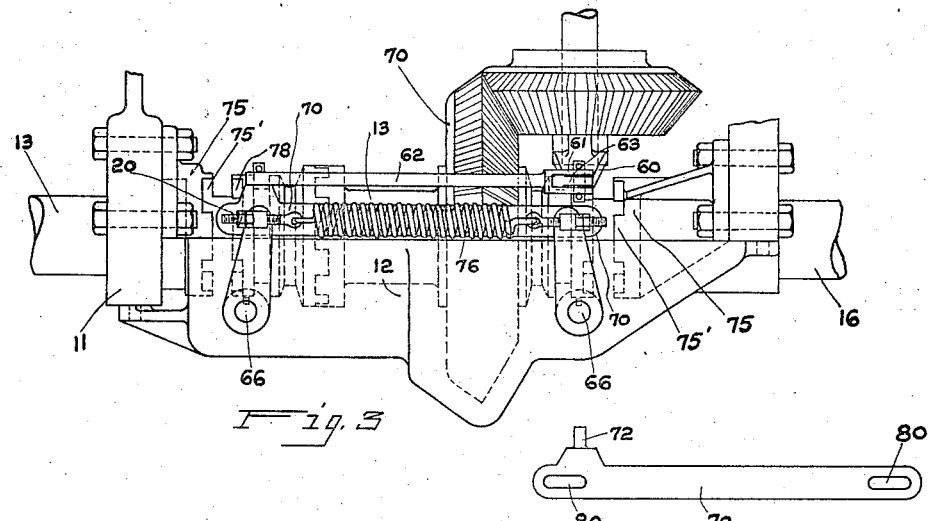
Fig. 3
Fig. 6
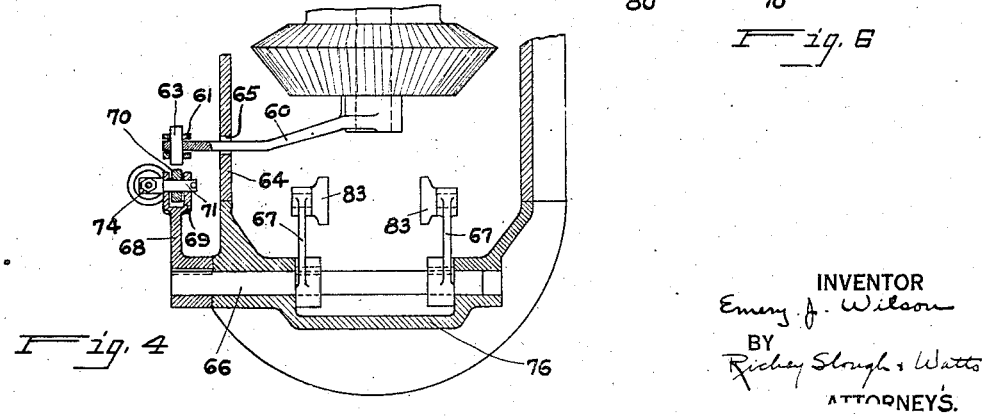
Fig. 4
INVENTOR
Emery J. Wilson
BY
Richey Slough & Watts
ATTORNEYS.

Patented Dec. 21, 1926.

1,611,701

UNITED STATES PATENT OFFICE.

EMERY J. WILSON, OF CLEVELAND, OHIO, ASSIGNOR TO THE THEW SHOVEL COMPANY, OF LORAIN, OHIO, A CORPORATION OF OHIO.

STEERING MECHANISM FOR ENDLESS-TRACK-PROPELLED VEHICLES.

Application filed December 17, 1924. Serial No. 756,485.

This invention relates to steering mechanism for tracklaying vehicles.

Vehicles of this type are usually steered by controlling the relative speed at which the tracks rotate, and is generally accomplished by varying the speed of rotation of the tracks, or by declutching one of the mechanisms for driving the tracks. Hand operated mechanism is usually provided to operate the steering mechanism in small vehicles, but in the larger and heavier type of vehicles, it is more desirable to operate the steering gear by power. Power operated steering gear is especially desirable in vehicles having a rotatable superstructure, as the operator is stationed upon the superstructure which is usually a considerable distance from the mechanism on the main frame which must be actuated to steer the vehicle.

An object of my invention is to provide power operated mechanism for controlling the direction in which a tracklaying vehicle will travel.

Another object of my invention is to provide mechanism which can be manually associated with the transmission mechanism to operate the steering mechanism.

Still another object of my invention is to provide a power operated steering mechanism which is associated with a vehicle having a rotatable superstructure, so that it can be operated in any position in which the superstructure may assume relative to the main supporting frame of the vehicle.

These and other objects, and the invention itself will appear in the following specification.

In the accompanying drawings—

Fig. 1 is a fragmentary sectional elevation of a tracklaying vehicle having my invention associated therewith;

Fig. 2 is a top plan view of the clutch actuating mechanism;

Fig. 3 is an end elevation of the same; and

Fig. 4 is a side elevation of the same partially in section;

Fig. 5 is an elevation of certain clutch operating mechanism;

Fig. 6 shows an elevation of a steering rod link shown in Figs. 2 to 5 inclusive; and Fig. 7 shows a section on the line 7—7 of Fig. 1.

Referring to the drawings by characters of reference, 10 indicates the main frame or base of a vehicle of the class supported and propelled by endless tracks at each side thereof. The base is provided with depending bearings 11 at the sides thereof, and a depending bearing 12 intermediate the side bearings. Such bearings are provided with aligned apertures to receive shafts 13 and 16 for propelling the endless tracks. A shaft 13 extends through the bearing 12 and one of the bearings 11 and is provided with a reduced central extension 14 which projects into a central recess 15 in the end of a shaft 16 which is carried in the other bearing 11. Bushings 17 are interposed intermediate the shafts 13 and 16 and the bearings 11, and the hub 18 of a bevel gear 19 extends intermediate the shaft 13 and the bearing 12. A bushing 20 is interposed intermediate the gear hub 18 and the bearing 12, and bushings 21 are interposed intermediate each end of the hub 18 and the shaft 13. The shafts, it will be observed, are rotatable relative to their bearings including the hub of the gear 19 and relative to each other. A collar 22 is pinned to each of the shafts adjacent the inner side wall of the bearings 11 and gears 23 are secured to the end of these shafts exteriorly of the bearings 11, thereby preventing lateral displacement of the shafts.

Each end of the gear member 19 is provided with clutch faces 24 which are adapted to engage with the adjacent faces of the clutch members 25 which are slidably mounted upon the shafts 13 and 16. The shafts are provided with flat faces 26 so that the clutch members will be secured to rotate therewith. It is obvious that the rotation of the gear 19 will rotate either or both of the shafts 13 and 16 when one or both of the clutches secured to rotate with such shafts are moved endwise into engagement with such gear. It will also be understood that the gears 23 will rotate driving sprockets which engage endless tracks at either side of the base, and that when one shaft is declutched from the gear 19 that the associated track will not be driven, whereby the other track which is driven will propel the vehicle in a direction toward the idling track to steer the vehicle. By declutching one of the clutches 25, the traction mechanism with which it is associated will rotate idly and a larger turning radius is produced than if this traction mechanism remained stationary. To provide a short turning radius I provide two fixed jaw clutch members 75 secured to the main frame 10 by bolts 77 and having jaw teeth 75¹ at their inner ends. The outer ends of the clutches 25 are provided with teeth 78 which will engage with the teeth 75¹ to lock the driving shafts 13 and 16 when the clutches are shifted to such position. When a small turning radius is desired, either one of the clutches is shifted into the engagement just described and the driving mechanism associated therewith will remain stationary while the other driving mechanism is rotating.

The base is provided upon its upper surface with a circular track 27, and with an axial vertically extending hollow bearing member 28. The frame 88 of a superstructure is rotatably carried by the base, and brackets 29 extend from the bottom of the frame and carry rollers 30 which are arranged to rotatably support the superstructure upon track 27 of the base. The frame 88 is provided with a vertically extending bearing 31, and the upper end of the bearing 28 extends partially therein to maintain the superstructure in rotatable relation with the base.

A hollow shaft 32 extends through the bearing members 31 and 28, and bushings 33 and 34 are interposed between such shaft and the bearing members respectively. A bevel gear 35 is secured to the upper end of the shaft 32 projecting beyond the bearing 31, and a bevel gear 36 is fixed to the lower end of the shaft 32 projecting below the bearing 28. The gear 36 is arranged so that it is in mesh with the gear 19. The end of the shaft 32 is reduced and projects through a central aperture in the gear 36, and a collar 37 is screwed upon the threaded reduced end of the shaft to retain the gear thereon.

A support 38 having a bearing is secured upon the upper surface of the superstructure frame, and a driven shaft 40 extends through and is supported thereby. It is understood that a power unit, such as an engine is mounted upon the frame 88 and that the shaft 40 is connected to and driven by such power unit. A bevel gear 41 is splined to the end of the shaft 40 and is arranged so that it meshes with the bevel gear 35. The upper end of the shaft 32 is threaded and a collar 42 is screwed thereupon to prevent displacement of the gear 35 therefrom. It will thus be seen that the gear 19 is rotated by the power unit on the superstructure through the shafts 40 and 32, and the gears 41, 35 and 36.

A shaft 43 extends through the hollow shaft 32 and is rotatable therein. the ends of such shaft projecting beyond the ends of the hollow shaft. A bracket 44 is supported upon the support 39 and is provided with a bearing 45 through which the upper end of the shaft 43 extends, and a collar 46 is secured to the shaft by a set screw 47, to prevent vertical displacement of the shaft. A bushing 48 is interposed between the bearing 45 and the shaft 43. A bevel gear 49 is rotatably mounted upon and is secured against vertical displacement adjacent the bearing 45 by a collar 50 which is secured to the shaft by a set screw 51. The gear 49 is arranged so that it is in mesh with the gear 41.

The gear 49 is provided with a cone clutch face 52 and the gear 35 is provided with a clutch face 53, which faces are interchangeably adapted to be engaged by a power transmitting member 96 having cone clutch faces 54 at each end thereof. The cone faces of the power transmitting member are formed to extend within the faces of the gears and the transmitting member is slidably keyed to the shaft 43 intermediate the gears 49 and 35, so that by moving one or the other of the sets of faces together the rotation of the associated gear will rotate the shaft 43.

The end of the shaft 40 is provided with a recess, and a pin 55 is secured within such recess by a plate 56 which is secured, by screws 56′, Fig. 1, over the enlarged portion of the pin which lies within the recess. A pair of links 57 are pivotally supported at one end on the reduced portion of the pin 55 through the medium of a block 57′ held in place by a cotter pin 57″ and at the other end are attached through pin 91 and intermediate link 92 to an arm 93 of a hand lever 58. At 94 and 95 are shown projecting arms from the links 57 which engage the circular groove 59 in the transmitting member. A slight movement of the hand lever in either direction will operate the linkage sufficiently to move the power transmitting member into engagement with either gear 35 or 54. It is also understood that when the power transmitting member is in a position centrally of the gears 35 and 49, the clutch faces will be disengaged, so that the shaft 43 will not be rotated.

In order to hold the power transmitting member 96 in either normal, central or in upper or lower gear engaging positions, I provide for the lever 58 a notched sector plate 97, into the notches of which a spring pressed detent 98 may be projected except when the operator by grasping the end 99 of the detent together with the handle of the lever 58, draws them together and lifting the lower end of the detent free of the notches in the plate 97.

An arm 60 is keyed to the lower end of the shaft 43, and the bifurcated end 61 of a rod 62 is pivotally secured to the projecting end of the arm by a pin 63. The rod 62 extends parallel with the aligned axles 13 and 16 exteriorly of the casing portion 64 of the base enclosing said axles, a slot 65 being provided in the casing, through which the arm 60 extends. A pair of shafts 66 are carried in bearings formed in the casing 76 and project outwardly therefrom beneath the rod 62. The shafts 66 extend transversely within the casing, beneath the clutches 25 and spaced arms 67 are secured thereto, the free ends of such arms carrying shoes 83 which slide in circular grooves in the clutch members. Upwardly extending levers 68 are secured to the end of the shafts 66 and are provided with bifurcated upper ends 69. A rod 70 extends intermediate the bifurcated ends of the levers 68 and are secured thereto by pins 71. The end portions of such rod are slotted longitudinally at 80 and the pins 71 extend through such slots and are secured to the levers 68. The rod 70 is provided at one end with an upstanding projection 72 which is adapted to extend through an aperture 73 in the end of the rod 62. Suitable means such as a cotter key is provided to prevent displacement of the rod 62 from the projection 72.

The outer ends 74 of the pins 71 are enlarged and provided with an aperture to receive eye-bolts 75. A coil spring 76¹ is secured at each end to the eye-bolts and nuts 77 are provided to maintain the eye-bolts in desired relation. The tension of the spring 76 is such that it maintains the levers 68 inclined toward each other, in which position the arms 67 maintain the clutch members 25 in engagement with the gear 19, so that normally both shafts 13 and 16 will be driven at the same speed thereby propelling the vehicle in a straight direction. The slots 80 in the rod 70 are arranged so that the pins 71 secured to the levers 68 will rest against the inner ends thereof, so that movement of the rod 70 will move one of the pins and levers 68 therewith, while the other pin and lever will not be moved, thus only one of the clutches will be moved when the steering gear is operated.

When it is desired to steer the vehicle, the operator moves the hand lever 58 so that the power transmiting member is moved to a position of frictional contact with the clutch face of either of the driven gears 35 or 49, depending upon the direction it is desired to turn. Such frictional contact will rotate the shaft 43 in the same direction of rotation as that in which the gear is rotating, and will move the rod 62, by means of the arm 60, lengthwise. The movement of the rod 62 will move the rod 70 thereby rotating one of the levers 68 which will in turn release the clutch member operated thereby from the gear 19. The frictional contact of the power transmitting shaft with either of the associated driven gears can be regulated by the hand lever to maintain the desired clutch member in released relation when and as long as steering is required. When the hand lever is in normal position, it will be apparent that the spring 76 will return the clutch member just operated to normal clutched relation with the gear 19, thereby driving the vehicle in a straight direction.

Various changes can be made in the details of construction described without departing from the spirit of my invention and the scope of the appended claims.

What I claim is:—

1. In a vehicle of the class described, a pair of aligned propelling shafts, a source of power, transmission mechanism including a gear having clutch faces, a pair of clutches normally engaging the clutch faces of said gear and secured to said shafts, mechanism adapted to be operated by said transmission mechanism for moving either one of said clutches out of engagement with said gear, and manually operable means for moving said mechanism into or out of driven engagement with said transmission mechanism.

2. In a vehicle of the class described, a pair of aligned propelling shafts, a clutch slidably and non-rotatably mounted upon each of said shafts, a source of power, transmission mechanism operated by said power unit including a gear having clutch faces at each end, said clutches being normally maintained in engagement with the clutch faces of said gear, means adapted to be operated by said transmision mechanism for selectively releasing either one of said clutches, and manually operated means for moving said means into or out of engagement with said transmission mechanism.

3. In vehicles of the class described, a pair of propelling shafts, a power unit, transmission mechanism extending from said power unit adjacent said shafts, said mechanism including a vertically disposed shaft, means rotated in opposite directions by said transmission mechanism and arranged about the upper end of said vertical shaft, clutches normally connecting said shafts with said transmission mechanism, and mechanism associated with said oppositely rotating means for selectively shifting either one of said clutches out of engagement with said transmission mechanism, said mechanism being adapted to be moved manually into engagement with said means rotated in opposite directions by said transmission mechanism.

4. In a vehicle of the class described, a pair of propelling shafts, transmission mechanism, clutches normally in engagement with said transmission mechanism for rotating said shafts, pivoted arms for shifting said clutches out of engagement with said transmission mechanism, a rod for operating one of said arms when moved in one direction and for operating the other of said arms when moved in the opposite direction, resilient means intermediate said arms for normally maintaining said arms in a position to connect said clutches with said transmission mechanism, means for moving said rod in a direction to release either one of said clutches, said means being operated by said transmission mechanism, and manually operated means to connect or disconnect said means with said transmission mechanism.

5. In a vehicle of the class described including a base and a superstructure rotatably carried thereby, a pair of aligned propelling shafts carried by said base, a source of power carried by said superstructure, transmission mechanism extending from said source of power axially through said superframe adjacent said shafts, clutches normally engaging said transmission mechanism for rotating said shafts, mechanism extending co-axially with said transmission mechanism through said superstructure for disengaging either one of said clutches to steer the vehicle, means for connecting said clutch operating mechanism with said transmission mechanism to be operated thereby, and manually operated means mounted upon said superstructure for shifting said connecting means into or out of engagement with said transmission mechanism.

6. The combination, with traction elements and a base supported thereby, of a rotatable frame mounted upon said base, a source of power on said rotatable base, transmission mechanism located partially in the axis of rotation of said rotatable frame and driven by said source of supply for driving said traction elements, means for controlling the relative rotation of said traction elements, said means extending partially co-axial with the axis of rotation of said rotatable frame and being adapted to be operated by said transmission mechanism, and means on said rotatable frame for connecting or disconnecting said controlling means with said transmission mechanism, said controlling means being operable from any position of movement of said rotatable frame.

In testimony whereof I hereunto affix my signature this 18th day of November, 1924.

EMERY J. WILSON.